United States Patent Office.

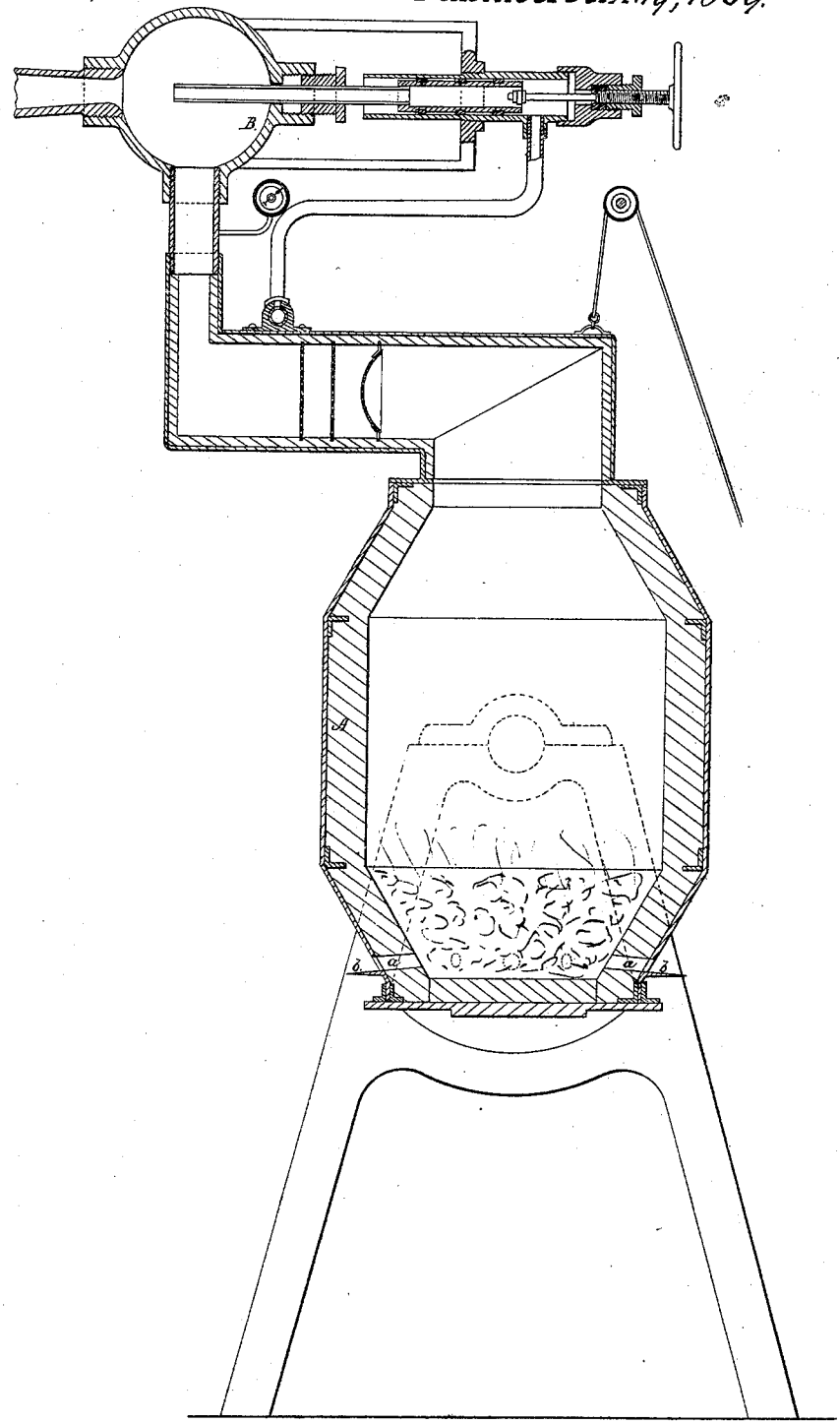

JOHN ABSTERDAM, OF NEW YORK, N. Y.

Letters Patent No. 86,050, dated January 19, 1869.

IMPROVEMENT IN REFINING AND PURIFYING IRON BY MEANS OF FLUXES INTRODUCED BY SUCTION.

The Schedule referred to in these Letters Patent and making part of the same.

*To all whom it may concern:*

Be it known that I, JOHN ABSTERDAM, of the city, county, and State of New York, have invented a new and improved Process for Introducing Fluxes into Converters, Furnaces, &c., by Suction; and I do hereby declare the following to be a full, clear, and exact description thereof, which will enable those skilled in the art to make and use the same.

This invention consists in introducing nitrates, muriates, oxides, or other chemicals or materials, capable of supplying oxygen or of acting as fluxes, or both, either in a liquid or solid form, into the molten metal in a converter, furnace, pot, retort, or other vessel, by suction, in contradistinction to the process heretofore known, where such fluxes have been introduced into the molten metal by force.

In order to facilitate the explanation of my process, I will refer to the annexed sketch, which represents a sectional view of my apparatus, such as I may use in carrying out my invention, though I will here remark that I do not wish to confine myself to any particular apparatus, but reserve the right to make such changes in the same as may be desirable, according to varying circumstances.

In carrying out my invention, I introduce the metal or ore to be acted upon by the chemicals or fluxes, into a vessel, A, which may be constructed like an ordinary converter, as shown, in which case the metal is introduced therein in a molten state; or said vessel may represent a cupola or furnace, in which case the metal is first fused in the same before the fluxes are introduced.

This vessel is provided with holes, *a*, in its sides, and its mouth is connected with a suction-apparatus, B, of any suitable construction.

Under the holes *a*, and on the outside of the vessel A, are semicircular shelves, *b*, on which the fluxes to be introduced are placed, or said holes can be made to connect with a hopper or vessel containing the fluxes.

The fluxes which I use are generally the nitrate of potash and nitrate of soda; also, the oxygenated muriates of potash, baryta, soda, lime, magnesia, and manganese; also, the fluor-spars and fluate of lime; also, the carbonates of lime and hydrate of lime; also, the oxides of manganese, lead, mercury, and iron, which, however, must be free from sulphur, phosphorus, and arsenic.

I first prepare the nitrates, by melting them in crucibles, or other suitable vessels, and casting them into suitable lumps, in wooden moulds. The lumps I immediately reduce to powder, by grinding or otherwise, and preserve the same in glass or wooden jars or boxes, well closed from contact with the atmosphere, and keep in a dry place until ready for use.

The object of the melting and casting is simply to expel from the nitrates the water of crystallization.

The oxides, carbonates, and fluates, are first heated, so as to deprive them of their moisture.

The fluxes, on being introduced into the converter, pot, furnace, or retort, by suction, permeate the molten metal, together with the atmospheric air, and the effect produced thereby is the supplying of a large volume of oxygen, which is set free from the nitrates or oxides by the great heat of the molten metal, and which unites with the carbon of the iron, forming carbonic acid, or carbonic-oxide gas, which passes off, leaving the iron in a state ready to be rolled into blooms for making wrought-iron.

But by introducing into the molten pig-iron only such a quantity of nitrates or oxides as to decarbonize the iron to the degree required for making steel, or semi-steel, I obtain ingots from the same that can be rolled into rails and other bars, or rolled or hammered into any other article of manufacture that may be required.

The salts of the nitrates or muriates, and the oxides, after having supplied oxygen for divesting or partially divesting the iron of its carbon, are acting as fluxes in depriving the molten metal of other impurities.

Another material advantage of my process is, that the fluxes, on being introduced by suction, come in contact with the molten iron, together with the atmospheric air drawn in by the suction, and by the air an additional supply of oxygen is furnished, and at the same time the nitrogen of the atmospheric air forms a carrier for carrying off the dilated or aeriform impurities.

Having thus described my invention,

What I claim as new, and desire to secure by Letters Patent, is—

The within-described process of introducing into a converter, furnace, pot, or retort containing molten metal, nitrates, muriates, oxides, or other chemicals, capable of supplying oxygen, or of acting as fluxes, either or both, by suction, substantially as set forth.

JOHN ABSTERDAM.

Witnesses:
 W. HAUFF,
 ERNEST F. KASTENHUBER.